United States Patent
Zou et al.

(10) Patent No.: US 11,740,780 B2
(45) Date of Patent: Aug. 29, 2023

(54) MULTI-SCREEN DISPLAY SYSTEM AND MOUSE SWITCHING CONTROL METHOD THEREOF

(71) Applicant: GOERTEK INC., Shandong (CN)

(72) Inventors: Libing Zou, Shandong (CN); Yifan Zhang, Shandong (CN); Fuqiang Zhang, Shandong (CN); Xueqiang Wang, Shandong (CN)

(73) Assignee: GOERTEK INC., Shandong (CN)

( * ) Notice: Subject to any disclaimer, the term of this patent is extended or adjusted under 35 U.S.C. 154(b) by 39 days.

(21) Appl. No.: 17/594,145

(22) PCT Filed: Oct. 30, 2020

(86) PCT No.: PCT/CN2020/125256
§ 371 (c)(1),
(2) Date: Oct. 4, 2021

(87) PCT Pub. No.: WO2021/129144
PCT Pub. Date: Jul. 1, 2021

(65) Prior Publication Data
US 2022/0171512 A1    Jun. 2, 2022

(30) Foreign Application Priority Data

Dec. 25, 2019  (CN) .......................... 201911356809.7

(51) Int. Cl.
*G06F 3/0487*    (2013.01)
*G06V 10/82*    (2022.01)
(Continued)

(52) U.S. Cl.
CPC ............ *G06F 3/0487* (2013.01); *G06F 3/012* (2013.01); *G06F 3/013* (2013.01); *G06F 3/038* (2013.01);
(Continued)

(58) Field of Classification Search
CPC ........ G06F 3/0487; G06F 3/012; G06F 3/013; G06F 3/03543; G06F 3/038; G06F 3/1423; G06V 10/82; G06V 40/161; G06V 40/18
See application file for complete search history.

(56) References Cited

U.S. PATENT DOCUMENTS

| | | | |
|---|---|---|---|
| 9,866,916 B1 | 1/2018 | Boss et al. | |
| 2006/0192775 A1* | 8/2006 | Nicholson | G06F 3/013 345/211 |

(Continued)

FOREIGN PATENT DOCUMENTS

| | | |
|---|---|---|
| CN | 103440038 A | 12/2013 |
| CN | 104932707 A | 9/2015 |

(Continued)

OTHER PUBLICATIONS

The State Intellectual Property Office of the People's Republic of China, First Office Action, Application No. 201911356809.7 dated Nov. 4, 2022.
(Continued)

*Primary Examiner* — Ariel A Balaoing
(74) *Attorney, Agent, or Firm* — LKGlobal | Lorenz & Kopf, LLP (57) ABSTRACT

A multi-screen display system and a mouse switching control method are disclosed. The mouse switching control method is applied to a multi-screen display system comprising a main display screen and at least one extended display screen, and comprises: obtaining user images collected by cameras installed on the main display screen and the extended display screen respectively; inputting the user images into a neural network model, and predicting a screen that a user is currently paying attention to using the neural network model to obtain a prediction result; and controlling to switch a mouse to the screen that a user is currently paying (Continued)

attention to according to the prediction result. The system and mouse switching control method are based on self-learning of visual attention, predict the current screen operated by the user, automatically switch the mouse to the corresponding screen position, and improve the user experience.

8 Claims, 2 Drawing Sheets

(51) Int. Cl.
    *G06V 40/16*     (2022.01)
    *G06V 40/18*     (2022.01)
    *G06F 3/01*     (2006.01)
    *G06F 3/0354*     (2013.01)
    *G06F 3/038*     (2013.01)
    *G06F 3/14*     (2006.01)

(52) U.S. Cl.
    CPC ........ *G06F 3/03543* (2013.01); *G06F 3/1423* (2013.01); *G06V 10/82* (2022.01); *G06V 40/161* (2022.01); *G06V 40/18* (2022.01)

(56) References Cited

U.S. PATENT DOCUMENTS

| | | | | |
|---|---|---|---|---|
| 2008/0024433 | A1* | 1/2008 | Gunther | G09G 5/006 345/156 |
| 2013/0016202 | A1* | 1/2013 | Munegowda | H04N 1/00204 348/78 |
| 2014/0108309 | A1* | 4/2014 | Frank | G06Q 50/01 706/12 |
| 2014/0108842 | A1* | 4/2014 | Frank | G06F 40/40 713/323 |
| 2014/0152538 | A1* | 6/2014 | Ham | G06F 3/038 345/156 |
| 2015/0153827 | A1* | 6/2015 | Yun | G06F 3/038 345/156 |
| 2018/0046851 | A1* | 2/2018 | Kienzle | G06F 3/0481 |
| 2021/0397859 | A1* | 12/2021 | Arora | G06V 10/25 |

FOREIGN PATENT DOCUMENTS

| | | |
|---|---|---|
| CN | 104951084 A | 9/2015 |
| CN | 105446673 A | 3/2016 |
| CN | 107193366 A | 9/2017 |
| CN | 107515669 A | 12/2017 |
| CN | 108919982 A | 11/2018 |
| CN | 110231960 A | 9/2019 |
| CN | 110516677 A | 11/2019 |
| CN | 111176524 A | 12/2019 |
| JP | 2011035454 A | 2/2011 |

OTHER PUBLICATIONS

Shiwei, Cheng, Gaze Perception and Computation Method in the Environment of Mobile Device Interaction, Journal of Computer-Aided Design & Computer Graphics, Jan. 2019, vol. 31, No. 1, China Academic Journal Electronic Publishing House, Hangzhou.

* cited by examiner

MULTI-SCREEN DISPLAY SYSTEM AND MOUSE SWITCHING CONTROL METHOD THEREOF

CROSS REFERENCE TO RELATED APPLICATIONS

This Application is a U.S. National Stage entry under 35 U.S.C. § 371 based on International Application No. PCT/CN2020/125256, filed on Oct. 30, 2020, which claims priority to Chinese Patent Application No. 201911356809.7, filed on Dec. 25, 2019. These applications are hereby incorporated herein in their entirety by reference.

TECHNICAL FIELD

This Application pertains to the technical field of device control, and in particular to a multi-screen display system and a mouse switching control method thereof.

BACKGROUND

The multi-screen display system expands the display range of the main screen by using externally connected displays. The multi-screen display can not only expand the field of view, but also has a certain privacy protection function (for example, only public documents are displayed on the extended screen), so it is welcomed by more and more people in work and life. In actual use, the multi-screen extended display also brings inconvenience. For example, when switching between different screens, the user does not know which screen the mouse is currently on, and thus does not know how to slide the mouse to the current screen; in addition, due to different mouse usage habits of people, the relative position of the extended screen and the main screen also affect the user's operating experience to an extent. In short, the mouse switching control experience in the conventional multi-screen display system is not good. In addition, other objects, desirable features and characteristics will become apparent from the subsequent summary and detailed description, and the appended claims, taken in conjunction with the accompanying drawings and this background.

SUMMARY

In view of the above problems, the present disclosure is proposed to provide a multi-screen display system and a mouse switching control method thereof that overcome the above problems or at least partially solve the above problems.

According to an aspect of the present disclosure, a mouse switching control method is provided, which is applied to a multi-screen display system comprising a main display screen and at least one extended display screen. The mouse switching control method comprises:

obtaining user images collected by cameras installed on the main display screen and the extended display screen respectively;

inputting the user images into a neural network model, and predicting a screen that a user is currently paying attention to using the neural network model to obtain a prediction result; and controlling to switch a mouse to the screen that a user is currently paying attention to according to the prediction result.

According to another aspect of the present disclosure, a multi-screen display system is provided, which comprises a main display screen and at least one extended display screen, and it further comprises a host;

both the main display screen and the extended display screen are equipped with cameras for collecting user images;

the host is for obtaining user images collected by the cameras; inputting the user images into a neural network model, and predicting a screen that a user is currently paying attention to using the neural network model to obtain a prediction result; and controlling to switch a mouse to the screen that a user is currently paying attention to according to the prediction result.

According to yet another aspect of the present disclosure, a computer readable storage medium is provided. The computer readable storage medium stores one or more programs. When the one or more programs are executed by a processor, the above mouse switching control method is implemented.

It can be seen from the above that, the technical solutions of automatic mouse switching control according to the embodiments of the present disclosure are based on the visual attention mechanism, analyze the screen that the user's current visual attention is directed to using the deep learning neural network, and then automatically switch the mouse to the corresponding screen position. Thus, the mouse switching method of the present embodiment can quickly respond to user's operations and improve the user experience. Moreover, it has low requirement on the environment such as light and noise, and has good robustness. In addition, the present embodiment can be widely applied to various scenarios in work, home and study places, and thus has a great market value.

BRIEF DESCRIPTION OF DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Hereinafter, exemplary embodiments of the present disclosure will be described in more detail with reference to the drawings. Although the drawings show the exemplary embodiments of the present disclosure, it should be understood that the present disclosure can be implemented in various ways and should not be limited by the embodiments disclosed herein. On the contrary, the embodiments are provided for a more thorough and complete understanding of the present disclosure, so as to fully convey the scope of the present disclosure to those skilled in the art.

At present, the multi-screen mouse switching control mainly includes the traditional sliding method and keyboard shortcut method. The traditional sliding method needs to first determine which screen the mouse is currently located in and its position in the screen, and also need to know the position combination manner of the main screen and the extended screen. Only in this way can the hand and eye cooperate to complete the mouse sliding operation. The keyboard shortcut method does not need to consider how to slide, but attention must be paid to the position combination relationship between the main screen and the extended screen and the switching sequence. On the whole, the above two switching methods are not convenient enough and the user experience is not good.

Unlike the traditional multi-screen mouse switching control method, the present embodiment of the present disclosure provides a multi-screen mouse switching method based on the visual attention self-learning mechanism. The solution of the present embodiment can quickly respond to user's operations and improve the user experience. The overall design concept of the present disclosure is to collect data by the cameras installed on the main screen and the extended screen, and then analyze the vision in real time through the neural network, calculate the user's gazing degree on each screen, and finally output a screen with the largest gazing degree as the screen that the user is currently paying attention to. This technical solution has good robustness and high recognition accuracy.

Figure 1:
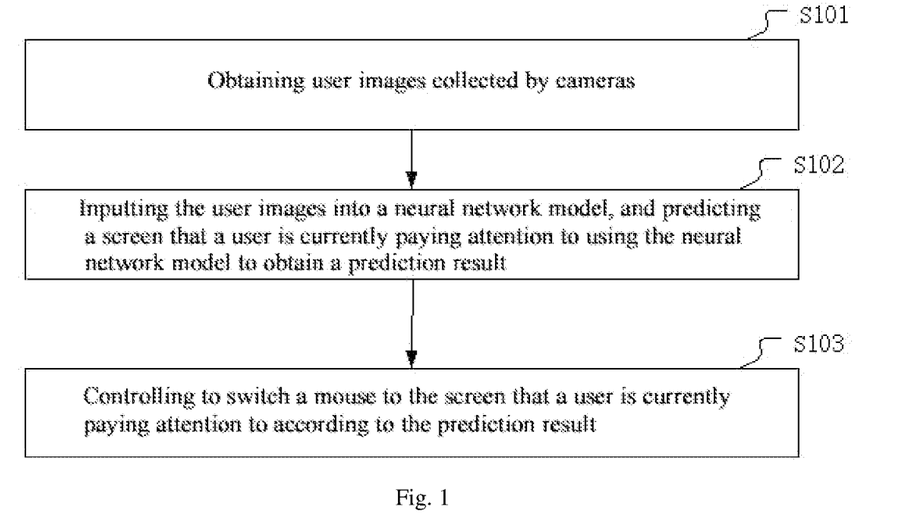
FIG. 1 is a schematic flowchart of a mouse switching control method according to an embodiment of the present disclosure.

FIG. 1 is a schematic flowchart of a mouse switching control method according to an embodiment of the present disclosure. Referring to FIG. 1, the mouse switching control method of the present embodiment is applied to a multi-screen display system comprising a main display screen and at least one extended display screen, and comprises the following steps:

Step S101, obtaining user images collected by cameras installed on the main display screen and the extended display screen respectively;

Step S102, inputting the user images into a neural network model, and predicting a screen that a user is currently paying attention to using the neural network model to obtain a prediction result; and Step S103, controlling to switch a mouse to the screen that a user is currently paying attention to according to the prediction result.

As shown in FIG. 1, the mouse switching control method of the present embodiment obtains user images collected by the cameras, inputs the user images into the neural network model, and obtains the prediction result of the screen that a user is currently paying attention to, and then controls to switch a mouse to the screen that a user is currently paying attention to according to the prediction result. The present embodiment predicts the screen that a user is currently paying attention to based on the deep learning neural network model, and is less influenced by the factors such as illumination, distance and pixels, so it has good robustness and higher recognition accuracy. Moreover, by predicting the screen that a user is currently paying attention to, and automatically switching the mouse to the screen the user is paying attention to, it can quickly respond to user operations and improve the user experience.

In an embodiment, inputting the user images into a neural network model, and predicting a screen that a user is currently paying attention to using the neural network model to obtain a prediction result comprises: inputting face data and eye data in the user images into the neural network model to obtain attention scores corresponding to the user images; when the attention scores corresponding to the user images are greater than a first threshold, sorting the attention scores greater than the first threshold in descending order, taking a screen corresponding to an attention score ranking first as the screen that a user is currently paying attention to, and determining a value of the prediction result as an identifier of the screen that a user is currently paying attention to; and when none of the attention scores is greater than the first threshold, determining that a value of the prediction result is null.

In other words, the user images are collected by the cameras on each display screen, and the neural network model is used to obtain the attention score corresponding to each image. A high attention score indicates a high probability that a screen is the screen that a user is currently paying attention to. Therefore, in the present embodiment, when the attention scores corresponding to the user images are greater than the first threshold, the attention scores that are greater than the first threshold are sorted in descending order, and the screen corresponding to an attention score ranking first is taken as the screen that a user is currently paying attention to, and the value of the prediction result is determined as the identifier of the screen that a user is currently paying attention to, which ensures the recognition accuracy. The screen identifier here is, for example, a digital identifier such as 1, 2, etc. After the identifier of the screen that a user is currently paying attention to is obtained, the mouse can be controlled to adjust and switch according to the identifier.

In actual use, the images collected by the camera may not contain the user's face and eye images. For example, the user's face or eyes are temporarily blocked by an object when images are collected. In this case, probably none of the attention scores is greater than the first threshold, then, at this point, the value of the prediction result determined by the neural network model is null.

The specific implementation of the mouse switching control is completed by the operating system. For example, in the present embodiment, when the model accuracy of the neural network model is greater than the second threshold, an identifier of the screen that a user is currently paying attention to, which is output by the neural network model, is output to the operating system, so that the operating system switches the mouse to the screen that the user is currently paying attention to. That is to say, if the overall accuracy of the neural network model is higher than the threshold, the result is output to the operating system, and the operating system adjusts the current position of the mouse to the screen with the highest score. If the overall accuracy of the neural network model is not higher than the threshold, it indicates that the prediction result at this time has a large error and is not suitable for switching the mouse. Correspondingly, the result is not output to the operating system and the current position of the mouse remains unchanged.

Therefore, in the visual attention detection based on user images, visual features are obtained through neural networks, the robustness is good and the recognition accuracy is better; however, the accuracy of neural network models is limited by the number and scale of samples. The richer the samples are, the higher the corresponding accuracy is. So this method requires a lot of sample data to support model training. To this end, in the mouse switching method of the present embodiment, on the basis of obtaining the user's visual features through the neural network, automatic sample online learning is added so as to realize the automatic promotion and improvement of the neural network model and continuously improve the prediction accuracy.

Figure 2:
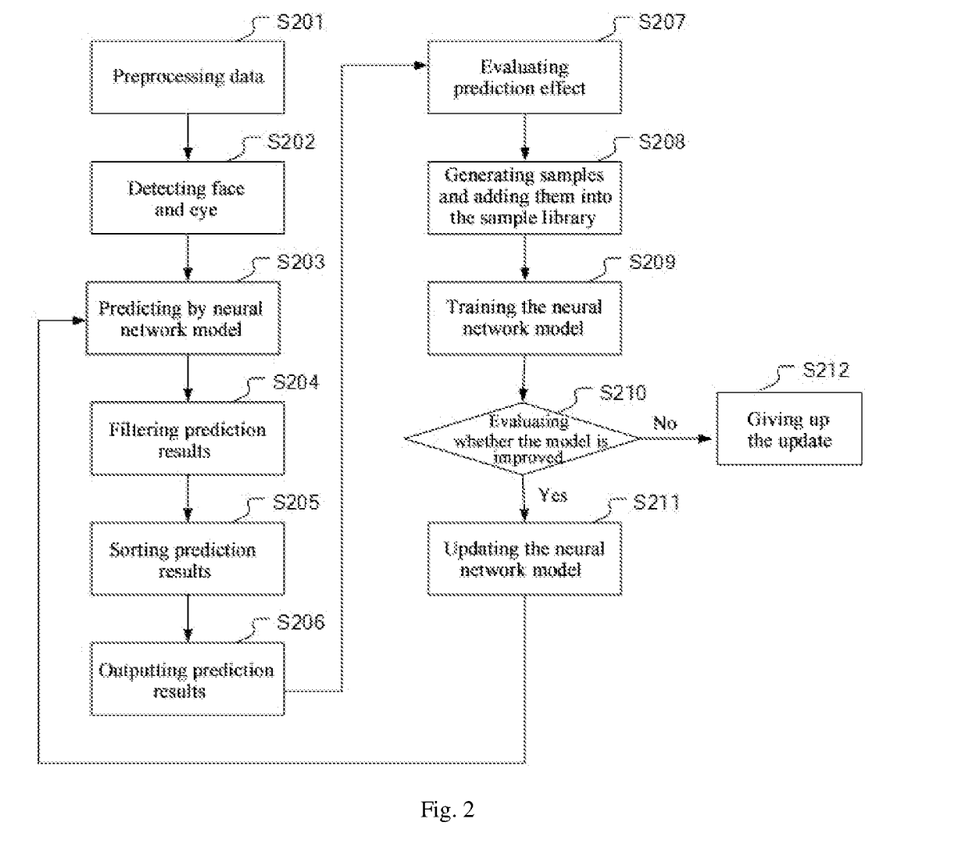
FIG. 2 is a schematic diagram of a mouse switching control method according to another embodiment of the present disclosure.

FIG. 2 is a schematic diagram of a mouse switching control method according to another embodiment of the present disclosure. The specific flow of the mouse switching control method in the present embodiment is described in conjunction with FIG. 2 as follows:

Step S201, preprocessing data.

In this step, the image data collected by each camera is corrected according to the internal and external parameters of the camera, where the number of cameras is the same as the number of display screens and the cameras are installed respectively on the main screen and the extended screen of the multi-screen display system. At the same time, in this step, the mouse and keyboard operation state data obtained by the detection are recorded to obtain the mouse and keyboard operation state and position. Please note that, in an embodiment, the time of collecting image data and the time of collecting mouse and keyboard operating state data are synchronized.

Step S202, detecting face and eye.

The image after corrected is input to the face and eye detector for detection. If no face is detected, the prediction process ends, otherwise, go to step S203. The face and eye detection can be implemented using conventional technology, which is not the focus of the present embodiment and will not be described in detail here.

Step S203, predicting by neural network model.

The face and eye data detected in the previous step are input into the neural network model to predict the user's current attention to each screen and obtain the corresponding score. For example, the face data and eye data collected by each camera are input into the neural network $Y_n$=sigmod $(f(I_n,E_n,\theta))$ to obtain the prediction result score $Y_n$, i.e., the current attention score of the screen n by the user which is predicted by the neural network model, where $\theta$ is a model parameter, n is the screen identifier number, $f(\ )$ is a nonlinear function of the neural network.

Step S204, filtering prediction results.

In this step, the prediction results obtained by the neural network model are filtered. For example, for all the prediction result scores $Y_n$, it is judged whether $Y_n$ is greater than a first threshold THRr (THRr is a preset threshold), and $Y_n$ greater than the first threshold THRr is added to the set $\varphi$, and if the prediction result score is lower than the first threshold THRr, it is discarded.

Step S205, sorting prediction results.

When there are values in the set $\varphi$, the data in the set $\varphi$ is sorted, for example, the attention scores greater than the first threshold are sorted in descending order, and the screen with the highest score is determined as the screen N that the attention is directed to, which is predicted by the neural network model. It should be noted that N may be null. For example, when there is no value in the set $\varphi$, then the prediction result N of the screen that the attention is directed to (i.e., the prediction result of the identifier of the screen that a user is currently paying attention to) is null.

Step S206, outputting prediction results.

Before outputting the prediction result with the highest score after sorting the prediction results higher than the first threshold THRr, the step of judging whether an output condition is met is performed, for example, only when the accuracy of the neural network model is higher than the second threshold, the result (i.e., the identifier of the screen that a user is currently paying attention to) is output to the operating system, and the operating system adjusts the current position of the mouse to the screen with the highest score. It should be noted that calculating and obtaining the accuracy of the neural network model belong to the prior art, and for details of calculating the model accuracy, please refer to the prior art, which will not be repeated here. If the accuracy of the neural network model is not higher than the second threshold, it means that the prediction error is large this time, so the prediction result is not output to the operating system.

Step S207, evaluating prediction effect.

As mentioned above, one of the innovations of the present embodiment is online generation of samples. Samples are generated online for neural network model training, thereby continuously updating and improving the prediction accuracy of neural network model. The premise of sample generation is to evaluate the effect of the prediction result. Therefore, the prediction effect evaluation is added in the present embodiment, in other words, the effect of the prediction result output by the neural network model at one time is evaluated. When the effect satisfies a condition, the data obtained in the prediction process this time is used to generate samples; when the effect does not satisfy the condition, the data obtained in the prediction process this time is not used to generate samples.

Specifically, the present embodiment evaluates the current prediction effect according to the user's current mouse and keyboard state and the prediction result. In other words, the prediction result is evaluated based on the prediction result and the data of the mouse and/or keyboard currently operated by the user, and the neural network model is updated online based on the evaluation result. Here, evaluating the prediction result according to the prediction result and data of the mouse and/or keyboard currently operated by the user comprises: when neither an operation attention prediction value nor the value of the prediction result is null (i.e., when the prediction result N of the screen that the attention is directed to is not null and the operation attention prediction value L is not null, the prediction effect is evaluated), judging whether the operation attention prediction value is equal to the value of the prediction result (i.e., whether N is equal to L); if Yes (i.e., the prediction value of the neural network model is consistent with the actual detection value), determining the value of the evaluation result to be a first value, for example, the evaluation result Result=1; if Not, determining the value of the evaluation result to be a second value, for example, the evaluation result Result=−1; wherein the operation attention prediction value is determined by a screen that the data of the mouse and/or keyboard currently operated by the user is directed to. When at least one of the operation attention prediction value and the value of the prediction result is null, ending a step of evaluation. For example, the prediction result N of the screen that the attention is directed to is NULL or the operation attention prediction value L is NULL, or both are null, the evaluation is not performed, and go to the next model prediction process.

Here, the operation attention prediction value refers to a screen that the user's attention is concentrated on, which is predicted based on the user's keyboard operation data and/or mouse operation data. The determination of the operation attention prediction value includes the following four cases. Specifically, the operation attention prediction value is determined in the following way. The first case: when it is detected that a user's operation object only includes a mouse, determining an identifier of the screen that the data of the mouse currently operated by the user is directed to as the operation attention prediction value; the second case: when it is detected that a user's operation object only includes a keyboard, determining an identifier of the screen that the data of the keyboard currently operated by the user is directed to as the operation attention prediction value; the third case: when it is detected that a user's operation object includes both a mouse and a keyboard, determining an identifier of the screen that the data of the keyboard currently operated by the user is directed to as the operation attention prediction value; the fourth case: when it is detected that neither a mouse nor a keyboard is currently operated by the user, determining the operation attention prediction value is null.

For example, in the present embodiment, the data of operating the mouse and keyboard by the user is detected. If the position of the mouse operated by the user changes and the changes are within the same screen m in a sampling period T, the value of the operation attention predicted value L is equal to m. If the user's keyboard operation is within the screen k, the value of the operation attention prediction value L is equal to k. If there are currently both a mouse operation and a keyboard operation, the value of the screen that the keyboard operation attention is directed to is taken as the final value of the screen L that the operation attention is directed to. That is to say, the evaluation of the prediction result in the present embodiment is based on the screen that the user's manual operation is directed to. This is because the screen to which the user's mouse and keyboard operation is directed to represents the user's intention, so at this point, the operational indication actively made by the user should prevail; in other words, the predicted value of the neural network model should be as close as possible to the operation attention prediction value. When there is no state data of operating the mouse and keyboard by the user, the operation attention prediction result L is null (the value is equal to NULL).

After the evaluation result is obtained, in an embodiment, updating online the neural network model according to the evaluation result comprises: dividing the user images collected by the cameras into different sample images according to different evaluation results, and extracting face data and eye data from different sample images to form positive samples and negative samples respectively; adding the positive samples and the negative samples into a sample library of the neural network model to obtain a new sample library; and updating online the neural network model using the new sample library.

Step S208: generating samples and adding them into the sample library.

In this step, positive and negative samples are generated according to the evaluation, and the samples are added into the sample library. For example, when the value of the evaluation result is the first value, the face data and eye data are extracted from a first sample image and marked as a positive sample, and the face data and eye data are extracted from a second sample image and marked as a negative sample, wherein the first sample image is obtained from a camera on the screen that a user is currently paying attention to, and the second sample image is obtained from a camera on a screen other than the screen that a user is currently paying attention to. When the value of the evaluation result is the second value, the face data and eye data are extracted from a third sample image and marked as a positive sample, and the face data and eye data are extracted from a fourth sample image and marked as a negative sample, wherein the third sample image is obtained from a camera on a screen indicated by the operation attention prediction value, and the fourth sample image is obtained from a camera on a screen other than the screen indicated by the operation attention prediction value.

After obtaining the positive and negative samples, updating online the neural network model using the new sample library comprises: when a positive sample update rate of the new sample library is greater than a third threshold and a negative sample update rate of the new sample library is greater than a fourth threshold, training the neural network model using the positive samples and the negative samples, and obtaining an accuracy increment of the neural network model after trained, wherein the positive sample update rate is determined based on a number of newly added positive samples and a total number of positive samples in the sample library, and the negative sample update rate is determined based on a number of newly added negative samples and a total number of negative samples in the sample library; when the accuracy increment is greater than a fifth threshold, updating online parameters of the neural network model to obtain a new neural network model.

That is to say, online sample generation and model update are implemented according to the evaluation value Result of the prediction effect. Following the example above, if Result=1, the face and eye data collected from the prediction result N of the screen that the attention is directed to is marked as a positive sample, and the face and eye data collected from cameras on other screens is marked as negative samples. If Result=−1, the data collected from the camera on the operation attention prediction value L is marked as a positive sample, and the face and eye data collected from cameras on other screens are marked as negative samples. The sample library is updated using the generated samples.

For example, a multi-screen display system comprises a total of four screens, among which screen 1 is the main screen, screens 2, 3 and 4 are extended screens, camera 1 is installed on screen 1, camera 2 is installed on screen 2, and so on.

If the prediction result N of the screen that the attention is directed to, which is output by the neural network model, is equal to the screen 2, and the screen L indicated by the data of the mouse and/or keyboard operated by the user is equal to the screen 4, then after comparison during the evaluation process, N is not equal to L, so the value of the evaluation result Result=−1; in the present embodiment, the image collected by the camera 4 on the screen 4 is taken as the positive sample image, the face and eye data in the positive sample image are taken as the positive sample, and the images collected by the respective cameras 1, 2 and 3 on the screens 1, 2, 3 are taken as negative sample images, and the face and eye data in the negative sample images are taken as negative samples, and then the positive samples and negative samples are stored together into the sample library.

In addition, in order to improve efficiency and ensure the accuracy of neural network model, in the present embodiment, after the newly generated samples are stored in the sample library, the positive and negative sample update rates in the sample library are calculated respectively, and the calculation formulas are as follows:

$$f_+ = \frac{P_{new}}{P_{total}}; \quad f_- = \frac{N_{new}}{N_{total}};$$

where $P_{new}$ is a number of new positive samples, $P_{total}$ is a total number of positive samples, $N_{new}$ is a number of new negative samples, and $N_{total}$ is a total number of negative samples.

If the positive sample update rate f+ is greater than a third threshold TX and the negative sample update rate f− is greater than a fourth threshold TY, the model training is started. TX and TY are corresponding thresholds, which are hyperparameters and can be set according to experience or actual needs.

Step S209, training the neural network model.

In this step, positive and negative samples are randomly selected from the sample library according to a certain ratio to form a new training set, verification set and test set. The backbone network of the neural network model in the present embodiment can be constructed based on a network such as Inception V3, Vgg19, and ResNet, and the loss function is, for example, a sigmod cross-entropy loss function. The specific training process belongs to the prior art and will not be explained in detail here.

Step S210, evaluating whether the model is improved, and if Yes, executing step S211; if No, executing step S212.

In this step, the accuracy of the newly obtained model is tested on the test set. If the accuracy of the model is improved, for example, the accuracy increment rate is greater than a fifth threshold ThrY (the threshold ThrY can be a hyperparameter), the neural network model for online prediction is updated using the new model, otherwise give up. The accuracy increment rate here is determined based on the accuracy before online training of the model and the accuracy after online training of the model. For example, the accuracy of the model before training (which can be understood as the ratio of the prediction value of the model to the actual value) is 70%, and the accuracy of the model after training becomes 80%, then the accuracy increment rate of the model is 10%.

Step S211, updating the neural network model.

The updating step is to update the parameters of the neural network model to obtain the updated neural network model. The specific details of updating the neural network model belongs to the prior art, and will not be repeated here.

Step S212, giving up the update.

Namely, if the accuracy of the model is not improved, for example, the accuracy increment rate is less than the fifth threshold ThrY (the threshold ThrY is a hyperparameter), then the update is given up, and the neural network model parameters remain unchanged.

It can be seen from the above that the mouse switching control method of the present embodiment obtains visual features through the neural network to predict the screen that the user is paying attention to, so it has good robustness and higher recognition accuracy; moreover, it provides online sample generation and model update processes, and obtains a neural network model with better performance, thereby avoiding the technical problem of poor performance of the neural network model caused by fixed samples or insufficient samples.

Figure 3:
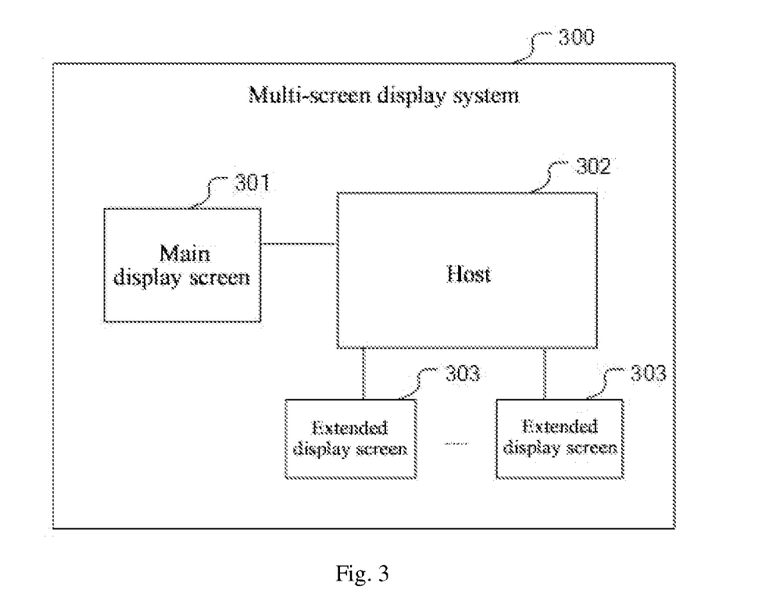
FIG. 3 is a block diagram of a multi-screen display system according to an embodiment of the present disclosure.

In addition, an embodiment of the present disclosure further provides a multi-screen display system. FIG. 3 is a block diagram of the multi-screen display system according to an embodiment of the present disclosure. Referring to FIG. 3, the multi-screen display system 300 of the present embodiment comprises a main display screen 301 and at least one extended display screen 303, and also comprises a host 302. Please note that FIG. 3 only shows two extended display screens, but in actual use, the number of extended display screens is not limited to this.

Both the main display screen 301 and the extended display screen 303 are equipped with cameras for collecting user images;

The host 302 is for obtaining user images collected by the cameras; inputting the user images into a neural network model, and predicting a screen that a user is currently paying attention to using the neural network model to obtain a prediction result; and controlling to switch a mouse to the screen that a user is currently paying attention to according to the prediction result.

In an embodiment of the present disclosure, the host 302 is specifically for inputting face data and eye data in the user images into the neural network model to obtain attention scores corresponding to the user images; when the attention scores corresponding to the user images are greater than a first threshold, sorting the attention scores greater than the first threshold in descending order, taking a screen corresponding to a largest attention score as the screen that a user is currently paying attention to, and determining a value of the prediction result as an identifier of the screen that a user is currently paying attention to; when none of the attention scores is greater than the first threshold, determining that a value of the prediction result is null.

In an embodiment of the present disclosure, the host 302 is specifically for, when a model accuracy of the neural network model is greater than a second threshold, outputting an identifier of the screen that a user is currently paying attention to, which is output by the neural network model, to an operating system, so that the operating system switches the mouse to the screen that a user is currently paying attention to.

In an embodiment of the present disclosure, the host 302 is further for evaluating the prediction result according to the prediction result and data of the mouse and/or keyboard currently operated by the user, and updating online the neural network model according to an evaluation result.

In an embodiment of the present disclosure, the host 302 is for dividing the user images collected by the cameras into different sample images according to different evaluation results, and extracting face data and eye data from different sample images to form positive samples and negative samples respectively; adding the positive samples and the negative samples into a sample library of the neural network model to obtain a new sample library; and updating online the neural network model using the new sample library.

In an embodiment of the present disclosure, the host 302 is specifically for when neither an operation attention prediction value nor the value of the prediction result is null, judging whether the operation attention prediction value is equal to the value of the prediction result; if Yes, determining a value of the evaluation result to be a first value; if Not, determining a value of the evaluation result to be a second value; wherein the operation attention prediction value is determined by the screen that the data of the mouse and/or keyboard currently operated by the user is directed to; when at least one of the operation attention prediction value and the value of the prediction result is null, ending a step of evaluation.

In an embodiment of the present disclosure, the operation attention prediction value is determined in the following way: when it is detected that a user's operation object only includes a mouse, determining an identifier of the screen that the data of the mouse currently operated by the user is directed to as the operation attention prediction value; when it is detected that a user's operation object only includes a keyboard, determining an identifier of the screen that the data of the keyboard currently operated by the user is directed to as the operation attention prediction value; when it is detected that a user's operation object includes both a mouse and a keyboard, determining an identifier of the screen that the data of the keyboard currently operated by the user is directed to as the operation attention prediction value; when it is detected that neither a mouse nor a keyboard is currently operated by the user, determining the operation attention prediction value is null.

In an embodiment of the present disclosure, the host 302 is specifically for, when the value of the evaluation result is the first value, extracting face data and eye data from a first sample image and marking them as a positive sample, and extracting face data and eye data from a second sample image and marking them as a negative sample, wherein the first sample image is obtained from a camera on the screen that a user is currently paying attention to, and the second sample image is obtained from a camera on a screen other than the screen that a user is currently paying attention to; when the value of the evaluation result is the second value, extracting face data and eye data from a third sample image and marking them as a positive sample, and extracting face data and eye data from a fourth sample image and marking them as a negative sample, wherein the third sample image is obtained from a camera on a screen indicated by the operation attention prediction value, and the fourth sample image is obtained from a camera on a screen other than the screen indicated by the operation attention prediction value.

In an embodiment of the present disclosure, the host 302 is specifically for, when a positive sample update rate of the new sample library is greater than a third threshold and a negative sample update rate of the new sample library is greater than a fourth threshold, training the neural network model using the positive samples and the negative samples, and obtaining an accuracy increment of the neural network model after trained, wherein the positive sample update rate is determined based on a number of newly added positive samples and a total number of positive samples in the sample library, and the negative sample update rate is determined based on a number of newly added negative samples and a total number of negative samples in the sample library; when the accuracy increment is greater than a fifth threshold, updating online parameters of the neural network model to obtain a new neural network model.

It should be noted that the implementation modes of the specific functions of the host in the foregoing system embodiment can be performed with reference to the specific implementation modes of the foregoing embodiments of mouse switching control method, which will not be repeated herein.

Figure 4:
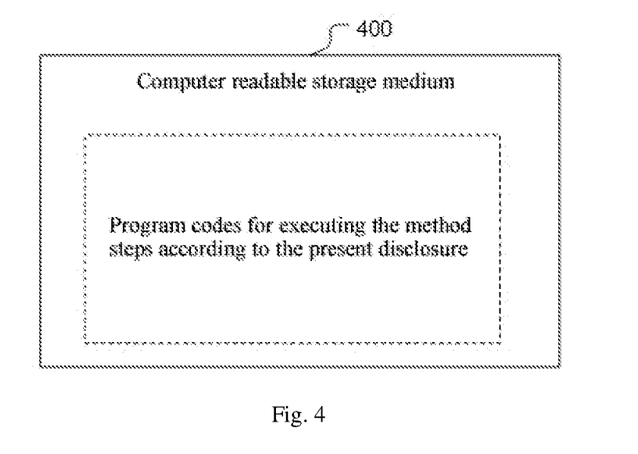
FIG. 4 is a schematic diagram of a computer storage medium according to an embodiment of the present disclosure.

An embodiment of the present disclosure provides a computer storage medium. FIG. 4 is a schematic diagram of a computer storage medium according to an embodiment of the present disclosure. Referring to FIG. 4, the computer readable storage medium 400 stores one or more programs, i.e., program codes for executing the method steps according to the present disclosure. The one or more programs, when executed by the processor, implement the mouse switching control methods in the foregoing embodiments.

Specifically, the one or more programs, when executed by the processor, implement the following mouse switching control method:

obtaining user images collected by cameras installed on the main display screen and the extended display screen respectively; inputting the user images into a neural network model, and predicting a screen that a user is currently paying attention to using the neural network model to obtain a prediction result; and controlling to switch a mouse to the screen that a user is currently paying attention to according to the prediction result.

Further, the one or more programs, when executed by the processor, also implement the following mouse switching control method:

inputting face data and eye data in the user images into the neural network model to obtain attention scores corresponding to the user images; when the attention scores corresponding to the user images are greater than a first threshold, sorting the attention scores greater than the first threshold in descending order, taking a screen corresponding to a largest attention score as the screen that a user is currently paying attention to, and determining a value of the prediction result as an identifier of the screen that a user is currently paying attention to; when none of the attention scores is greater than the first threshold, determining that a value of the prediction result is null.

Further, when a model accuracy of the neural network model is greater than a second threshold, outputting an identifier of the screen that a user is currently paying attention to, which is output by the neural network model, to an operating system, so that the operating system switches the mouse to the screen that a user is currently paying attention to.

Further, evaluating the prediction result according to the prediction result and data of the mouse and/or keyboard currently operated by the user, and updating online the neural network model according to the evaluation result.

Further, dividing the user images collected by the cameras into different sample images according to different evaluation results, and extracting face data and eye data from different sample images to form positive samples and negative samples respectively; adding the positive samples and the negative samples into a sample library of the neural network model to obtain a new sample library; and updating online the neural network model using the new sample library.

Further, when neither an operation attention prediction value nor the value of the prediction result is null, judging whether the operation attention prediction value is equal to the value of the prediction result; if Yes, determining a value of the evaluation result to be a first value; if Not, determining a value of the evaluation result to be a second value; wherein the operation attention prediction value is determined by the screen that the data of the mouse and/or keyboard currently operated by the user is directed to; when at least one of the operation attention prediction value and the value of the prediction result is null, ending a step of evaluation.

The specific functions implemented by the codes in the above embodiments of computer readable storage medium may refer to the specific implementation modes of the foregoing embodiments of mouse switching control method, which will not be repeated herein.

Those skilled in the art should understand that the embodiments of the present disclosure may be provided as a method, a system, or a computer program product. Furthermore, the present disclosure may take the form of a computer program product embodied on one or more computer-usable storage media (including, but not limited to, disk storage, CD-ROMs, optical memories, etc.) having computer-usable program code recorded thereon.

The present disclosure is described with reference to flowcharts and/or block diagrams of the method, device (system), and computer program product according to the embodiment of the present disclosure. It should be understood that each flow and/or block in the flowcharts and/or block diagrams, and combinations of the flows and/or blocks in the flowcharts and/or block diagrams may be implemented by computer program instructions. The computer program instructions may be provided to a processor of a general purpose computer, a special purpose computer, an embedded processor, or other programmable data processing device to generate a machine so that a machine for implementing the functions specified in one or more flows of a flowchart and/or one or more blocks of a block diagram can be generated by instructions executed by a processor of a computer or other programmable data processing device.

It should be noted that the terms "comprise", "include" or any other variations thereof are non-exclusive or open-ended, so that a process, method, article, or device including a series of elements includes not only those elements listed but also includes unspecified elements as well as elements that are inherent to such a process, method, article, or device. In the case that there is no more limitation, the phrase "comprising a . . . " does not exclude that the process, method, article, or device including the named element further includes additional named element.

The above are only specific embodiments of the present disclosure. Based on the above teaching of the present disclosure, those skilled in the art can make other improvements or modifications based on the above embodiments. Those skilled in the art should understand that the detailed description above is only for the purpose of better explaining the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A mouse switching control method applied to a multi-screen display system comprising a main display screen and at least one extended display screen, wherein the mouse switching control method comprises:

obtaining user images collected by cameras installed on the main display screen and the extended display screen respectively;

inputting the user images into a neural network model, and predicting a screen that a user is currently paying attention to using the neural network model to obtain a prediction result;

controlling to switch a mouse to the screen that a user is currently paying attention to according to the prediction result; and evaluating the prediction result according to the prediction result and data of the mouse and/or keyboard currently operated by the user, and updating online the neural network model according to an evaluation result, wherein inputting the user images into a neural network model, and predicting a screen that a user is currently paying attention to using the neural network model to obtain a prediction result comprises:

inputting face data and eye data in the user images into the neural network model to obtain attention scores corresponding to the user images;

when the attention scores corresponding to the user images are greater than a first threshold, sorting the attention scores greater than the first threshold in descending order, taking a screen corresponding to an attention score ranking first as the screen that a user is currently paying attention to, and determining a value of the prediction result as an identifier of the screen that a user is currently paying attention to; and when none of the attention scores is greater than the first threshold, determining that a value of the prediction result is null.

2. The method according to claim 1, wherein controlling to switch a mouse to the screen that a user is currently paying attention to according to the prediction result comprises:

when a model accuracy of the neural network model is greater than a second threshold, outputting an identifier of the screen that a user is currently paying attention to, which is output by the neural network model, to an operating system, so that the operating system switches the mouse to the screen that a user is currently paying attention to.

3. The method according to claim 1, wherein updating online the neural network model according to an evaluation result comprises:

dividing the user images collected by the cameras into different sample images according to different evaluation results, and extracting face data and eye data from different sample images to form positive samples and negative samples respectively;

adding the positive samples and the negative samples into a sample library of the neural network model to obtain a new sample library; and updating online the neural network model using the new sample library.

4. The method according to claim 3, wherein evaluating the prediction result according to the prediction result and data of the mouse and/or keyboard currently operated by the user comprises:

when neither an operation attention prediction value nor the value of the prediction result is null, judging whether the operation attention prediction value is equal to the value of the prediction result;

if Yes, determining a value of the evaluation result to be a first value; if Not, determining a value of the evaluation result to be a second value; wherein the operation attention prediction value is determined by a screen that the data of the mouse and/or keyboard currently operated by the user is directed to;

when at least one of the operation attention prediction value and the value of the prediction result is null, ending a step of evaluation.

5. The method according to claim 4, wherein the operation attention prediction value is determined in the following way:

when it is detected that a user's operation object only includes a mouse, determining an identifier of the screen that the data of the mouse currently operated by the user is directed to as the operation attention prediction value;

when it is detected that a user's operation object only includes a keyboard, determining an identifier of the screen that the data of the keyboard currently operated by the user is directed to as the operation attention prediction value;

when it is detected that a user's operation object includes both a mouse and a keyboard, determining an identifier of the screen that the data of the keyboard currently operated by the user is directed to as the operation attention prediction value;

when it is detected that neither a mouse nor a keyboard is currently operated by the user, determining the operation attention prediction value is null.

6. The method according to claim 4, wherein dividing the user images collected by the cameras into different sample images according to different evaluation results, and extracting face data and eye data from different sample images to form positive samples and negative samples respectively comprises:

when the value of the evaluation result is the first value, extracting face data and eye data from a first sample image and marking them as a positive sample, and extracting face data and eye data from a second sample image and marking them as a negative sample, wherein the first sample image is obtained from a camera on the screen that a user is currently paying attention to, and the second sample image is obtained from a camera on a screen other than the screen that a user is currently paying attention to;

when the value of the evaluation result is the second value, extracting face data and eye data from a third sample image and marking them as a positive sample, and extracting face data and eye data from a fourth sample image and marking them as a negative sample, wherein the third sample image is obtained from a camera on a screen indicated by the operation attention prediction value, and the fourth sample image is obtained from a camera on a screen other than the screen indicated by the operation attention prediction value.

7. The method according to claim 3, wherein updating online the neural network model using the new sample library comprises:

when a positive sample update rate of the new sample library is greater than a third threshold and a negative sample update rate of the new sample library is greater than a fourth threshold, training the neural network model using the positive samples and the negative samples, and obtaining an accuracy increment of the neural network model after trained, wherein the positive sample update rate is determined based on a number of newly added positive samples and a total number of positive samples in the sample library, and the negative sample update rate is determined based on a number of newly added negative samples and a total number of negative samples in the sample library; and when the accuracy increment is greater than a fifth threshold, updating online parameters of the neural network model to obtain a new neural network model.

8. A multi-screen display system comprising a main display screen and at least one extended display screen, wherein the system further comprises a host;

both the main display screen and the extended display screen are equipped with cameras for collecting user images;

the host is for obtaining user images collected by the cameras; inputting the user images into a neural network model, and predicting a screen that a user is currently paying attention to using the neural network model to obtain a prediction result;

controlling to switch a mouse to the screen that a user is currently paying attention to according to the prediction result; and evaluating the prediction result according to the prediction result and data of the mouse and/or keyboard currently operated by the user, and updating online the neural network model according to an evaluation result, wherein the host is specifically for inputting the user images into a neural network model, and predicting a screen that a user is currently paying attention to using the neural network model to obtain a prediction result comprises:

inputting face data and eye data in the user images into the neural network model to obtain attention scores corresponding to the user images;

when the attention scores corresponding to the user images are greater than a first threshold, sorting the attention scores greater than the first threshold in descending order, taking a screen corresponding to an attention score ranking first as the screen that a user is currently paying attention to, and determining a value of the prediction result as an identifier of the screen that a user is currently paying attention to; and when none of the attention scores is greater than the first threshold, determining that a value of the prediction result is null.

* * * * *